(12) United States Patent
Schult et al.

(10) Patent No.: US 12,110,869 B2
(45) Date of Patent: Oct. 8, 2024

(54) WIND TURBINE AND RETROFITTING SYSTEM AND METHOD FOR AT LEAST ONE WIND TURBINE

(71) Applicant: Siemens Gamesa Renewable Energy A/S, Brande (DK)

(72) Inventors: Matthias Schult, Sunds (DK); Erdal Özdag, Hamburg (DE)

(73) Assignee: Siemens Gamesa Renewable Energy A/S, Brande (DK)

(*) Notice: Subject to any disclaimer, the term of this patent is extended or adjusted under 35 U.S.C. 154(b) by 0 days.

(21) Appl. No.: 18/014,014

(22) PCT Filed: Jul. 2, 2021

(86) PCT No.: PCT/EP2021/068302
§ 371 (c)(1),
(2) Date: Dec. 30, 2022

(87) PCT Pub. No.: WO2022/008366
PCT Pub. Date: Jan. 13, 2022

(65) Prior Publication Data
US 2023/0332578 A1 Oct. 19, 2023

(30) Foreign Application Priority Data
Jul. 10, 2020 (EP) .................... 20185265

(51) Int. Cl.
F03D 80/10 (2016.01)
(52) U.S. Cl.
CPC .......... F03D 80/10 (2016.05); *F05B 2230/80* (2013.01)
(58) Field of Classification Search
CPC ......... F03D 80/10; F03D 7/00; F05B 2230/80
See application file for complete search history.

(56) References Cited

U.S. PATENT DOCUMENTS

2010/0156303 A1 6/2010 Wulff
2011/0241926 A1 10/2011 Laufer
(Continued)

FOREIGN PATENT DOCUMENTS

WO 2013053361 A2 4/2013

OTHER PUBLICATIONS

PCT International Search Report and Written Opinion of International Searching Authority mailed Oct. 12, 2021 corresponding to PCT International Application No. PCT/EP2021/068302 filed Jul. 2, 2021.

*Primary Examiner* — David E Sosnowski
*Assistant Examiner* — Maxime M Adjagbe
(74) *Attorney, Agent, or Firm* — Schmeiser, Olsen & Watts LLP

(57) ABSTRACT

A wind turbine includes a marking light system including a marking light for aerial traffic, a data source, including one light sensor, and a marking light controller for controlling the at least one marking light according to data of the data source, in particular sensor data of the light sensor, a wind turbine controller, a power line for the at least one marking light and/or one control line connecting the marking light controller to the wind turbine controller, wherein the wind turbine further includes a switching arrangement including at least one switching unit in the power line or the control line, wherein the switching unit receives a detection signal from an air traffic detection system and to turn the at least one marking light on or off when the detection signal indicates air traffic or no air traffic, respectively, in an area around the wind turbine.

11 Claims, 3 Drawing Sheets

(56) References Cited

U.S. PATENT DOCUMENTS

Figure 1:
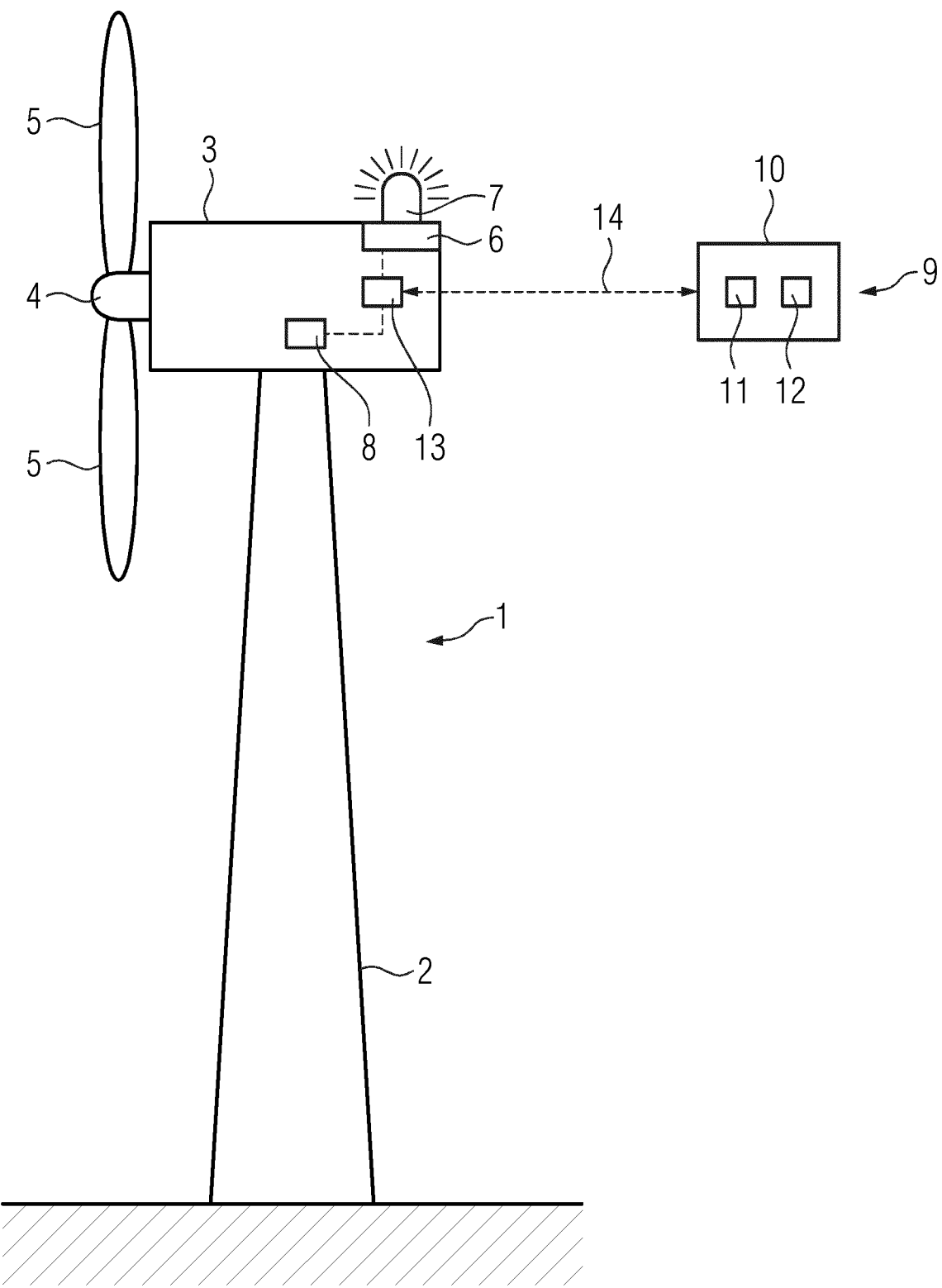

| | | | |
|---|---|---|---|
| 2013/0278445 A1* | 10/2013 | Quell | F03D 80/10 |
| | | | 340/983 |
| 2014/0300497 A1 | 10/2014 | Harms et al. | |
| 2018/0266397 A1 | 9/2018 | Ristau et al. | |
| 2018/0315325 A1 | 11/2018 | Hohaus et al. | |
| 2019/0257293 A1* | 8/2019 | Harms | H04N 7/181 |

* cited by examiner

WIND TURBINE AND RETROFITTING SYSTEM AND METHOD FOR AT LEAST ONE WIND TURBINE

CROSS-REFERENCE TO RELATED APPLICATIONS

This application claims priority to PCT Application No. PCT/EP2021/068302, having a filing date of Jul. 2, 2021, which claims priority to EP Application No. 20185265.4, having a filing date of Jul. 10, 2020, the entire contents both of which are hereby incorporated by reference.

FIELD OF TECHNOLOGY

The following relates to a wind turbine, comprising:
- a marking light system comprising at least one marking light for aerial traffic, a data source, in particular at least one light sensor, and a marking light controller for controlling the at least one marking light according to data of the data source,
- a wind turbine controller, and
- a power line for at least the at least one marking light and/or at least one control line connecting the marking light controller to the wind turbine controller.

The following further relates to a retrofitting system for at least one wind turbine and a method for retrofitting at least one wind turbine using such a retrofitting system.

BACKGROUND

Wind turbines are often tall structures that, at least if a certain height is surpassed, according to many legislations have to be marked by marking lights (warning lights) for air traffic. Hence, many wind turbines have been equipped with marking light systems, which may also be called obstruction lighting system or obstacle lighting system. Such a marking light system comprises at least one marking light, which may also be called warning light and may, for example, emit bright red light to warn pilots of aircrafts that a tall structure is present. Known marking light systems usually additionally comprise sensory equipment, for example at least one light sensor, such that the at least one marking light may be turned on as soon as a certain level of darkness has set in. A controller of the marking light system evaluates data from at least one data source, in particular the sensor data of the at least one light sensor and controls the at least one marking light accordingly. In some cases, the brightness of the at least one marking light may also be controlled according to the level of ambient light measured by the at least one light sensor, but due to other data. For example, regarding a visibility range. Of course, the at least one warning light is turned off again once a certain level of ambient light is re-established, for example during dawn.

However, legislative bodies of some countries, in particular in the future, may impose further restrictions on the use of marking lights. For example, in Germany, a law was passed that marking lights in wind turbines are only allowed to be activated when there actually is air traffic, in particular approaching air traffic, in a certain area around the wind turbine. In this manner, light pollution during nighttime shall be reduced to increase acceptance of wind turbines in the general public.

To adapt the functionality of wind turbines regarding such new requirements, air traffic detection systems have already been proposed in the state of the art. Such air traffic detection systems, which may be at least partly installed in the wind turbine itself and/or at least partly installed external to the wind turbine, may comprise at least one sensor for detecting air traffic. For example, the sensor of the air traffic detection system may be at least one radar sensor scanning the airspace around the wind turbine, and/or may be adapted to receive predefined transponder signals from aircrafts in the airspace around the wind turbine. That is, air traffic detection systems may be radar-based and/or transponder-based, respectively. Such air traffic detection systems may be installed for and/or associated with multiple wind turbines, for example in a wind park. In any case, the air traffic detection system provides an air traffic detection signal, in the following briefly "detection signal", which has to be evaluated in the wind turbine to only activate the marking lights when air traffic has been detected in the area around the wind turbine, in particular approaching air traffic.

However, known marking light systems, which are installed in wind turbines, often neither provide additional interfaces for external input, in this case the detection signal, nor are the controllers adapted to be re-programmed, in this case for additionally taking the detection signal into account. In such cases, the complete marking light system would have to be exchanged to ensure compatibility with current or future laws. In some marking light systems, the marking light controller may at least be configured to receive an input for modifying the brightness of the marking lights, for example from a wind turbine controller evaluating measurement data received from a visibility measurement device, wherein the visibility measurement device serves for judging a current visibility range, for example due to weather effects. While it may be in principle possible to supply the detection signal from the air traffic detection system to the wind turbine controller, which modifies the brightness signal to the marking light controller accordingly, this would require sophisticated and effortful reprogramming of the wind turbine controller, which is undesired and takes a long time.

SUMMARY

An aspect relates to provide a simple way to adapt a wind turbine with low expenditure to switch marking lights according to the detection signal of an air traffic device.

The wind turbine as initially described, according to embodiments of the invention, further comprises a switching arrangement comprising at least one switching unit in the power line or the control line, wherein the switching unit is configured to receive the detection signal from an air traffic detection system associated with the wind turbine and to turn the marking lights on or off when the detection signal indicates air traffic or no air traffic, respectively, in an area around the wind turbine.

The wind turbine controller may be any (already installed) control device of the wind turbine, preferably a main and/or master controller. Regarding the air traffic detection system, the wind turbine may comprise at least one component thereof or even the whole air traffic detection system. However, in particular for wind parks comprising multiple wind turbines, at least one air traffic detection device may be provided for multiple wind turbines, wherein each wind turbine, in particular as part of the switching arrangement, may comprise a receiver for the detection signal, which may be by wire and/or wirelessly transmitted to each wind turbine from the air traffic detection system. In particular, the air traffic detection system, which is associated with multiple wind turbines, may also determine wind turbine specific detection signals, each referring to a respective area around the wind turbine. In other embodiments, however, the wind park may also be treated as one entity with a defined area in which, in particular approaching, air traffic is relevant, such that marking lights of the whole wind park may be turned on/off based on the same detection signal supplied to all wind turbines.

The basic idea underlying embodiments of the invention is to be able to retrofit wind turbines to also take the detection signal into account when controlling the at least one marking light, such that no components of the wind turbine need to be exchanged, but only the switching arrangement needs to be added. However, if the power line and/or the control line are implemented as cables, these may have to be replaced by two cables or cut to permit positioning the switching unit in the respective line. The switching unit being in the power line means that the power line and thus power supply for the at least one marking light may be interrupted and re-connected by the switching unit. The switching unit being in the control line means that control signals, in particular brightness signals, may either be simply forwarded to the marking light controller or switched, in this case modified, to a state indicating that the at least one marking light is turned off. That is, whether the switching unit is installed in the power line or in the signal line, it in both cases serves to switch off the at least one marking light when no air traffic is detected in the area around the wind turbine. The switching arrangement thus works independently from any of the other systems but ensures that the at least one marking light can only be turned on when air traffic, in particular approaching air traffic, has been detected in the area around the wind turbine, as described by the detection signal. Thus, to retrofit a wind turbine to also account for the presence of air traffic around the wind turbine, neither the marking light system nor other components of the wind turbine, in particular the wind turbine controller, need to be modified in any way. The wind turbine is simply retrofit by a switching arrangement, which is either configured to interrupt the power supply to the at least one marking light or modify control signals, in particular brightness signals, from the wind turbine controller to the marking light controller such that the at least one marking light is not switched on unless the detection signal indicates relevant air traffic. The switching arrangement receives its input, namely the detection signal, from the air traffic detection system, such that it may be assured that the at least one marking light is not active anymore when no aircraft is within range.

In this manner, cost and effort are greatly reduced compared to exchanging the whole marking light system and/or the wind turbine controller/its software. Further, a wind turbine retrofitting system according to embodiments of the invention, which comprises the switching arrangement and may, in some cases, additionally comprise at least one component of the air traffic detection system, is very versatile and therefore integrable into many different types of wind turbines, in particular platforms and/or components, since these do not need to be modified. In particular, it is possible to fulfil legislation requirements without the need to update the wind turbine controller at all.

In a first alternative of embodiments of the invention, the switching unit may be a relay in the power line, in particular using the detection signal as the switching control signal. This first alternative is, of course, applicable in any wind turbine which uses a power line to supply electrical power to the at least one marking light, in particular also other components of the marking light system and/or the whole marking light system. A simple relay can be used, which uses the detection signal, which may, in particular, be binary, indicating relevant traffic or no relevant traffic, as the switching signal, wherein the relay may be in a powerless, open state as long as no relevant air traffic is detected in the area around the wind turbine. In particular, the detection signal used as a switching signal, in this case, may have zero or at least very low voltage as long as it indicates no relevant air traffic. If, however, at least one aircraft is detected in the area around the wind turbine, the detection signal may indicate this by being a direct current of higher voltage, such that the relay may be switched into the closed position and the at least one marking light may be lit according to data from the data source, in particular light sensor data.

However, in some embodiments, the marking light controller may be configured to generate an error signal to the wind turbine controller if it detects power disruption to the at least one marking light, since this is perceived as a fault condition by the manufacturer of the marking light system. In the retrofit wind turbine according to embodiments of the invention, however, due to the dedicated switching of the power by the switching unit, a power disruption to the at least one marking light caused by the switching unit is not a fault, but a desired effect.

Thus, in a preferred embodiment of the first alternative of embodiments of the invention, if the marking light controller is configured to generate an error signal to the wind turbine controller on power disruption to the at least one marking light, the switching arrangement additionally comprises a control unit receiving the error signal and the detection signal and configured to only forward the error signal when the error signal is not caused by switching activity of the switching unit, in particular when the detection signal indicates air traffic in the area around the wind turbine. That is, in particular, the control unit may be installed in the control line and may also receive the detection signal from the air traffic detection system. If the detection signal indicates no air traffic in the area around the wind turbine and the control unit receives an error signal due to the relay being open, this error signal may be suppressed/deleted, such that it is not received by the wind turbine controller which does not have to be configured to handle it. In other words, the input from the air traffic detection system, that is, the detection signal, can be used to disable error messages created by the marking light controller if the marking light controller switches on the at least one marking light, but does not receive the corresponding feedback, since the electrical power to the at least one marking light is not available because no aircraft is in range.

The control unit may be understood as a man in the middle, being installed in the control line between the marking light controller and the wind turbine controller. Output and/or input signals coming from the marking light controller and/or vice versa can be, at least partially, fed into the control unit analyzing, as a man in the middle, the signals according to desired functionalities and, in particular, forwarding them only if, for example, a real system problem occurred and not a fault caused by an interaction of the switching arrangement.

In particular, if the marking light controller is adapted to generate different error signals on different events, the control unit is configured to only block error signals relating to power disruption events depending on the detection signal. In this manner, actual fault conditions not caused by the switching arrangement may still be duly reported to the wind turbine controller.

In a concrete embodiment, the detection signal may be received by the control unit and forwarded to the switching unit, in particular modified and/or converted by the control unit. In some embodiments, the control unit of the switching arrangement may even comprise a wireless receiver for the detection signal of the, in particular externally installed, air traffic detection system. The detection signal may be modified and/or converted and then be forwarded to the switching unit, such that it can directly be used as a switching signal for the relay. For example, the in particular digital detection signal received in the control unit can be converted to a binary detection signal, having a low voltage when no air traffic is detected in the area around the wind turbine, and a high voltage, if air traffic has been detected in the area around the wind turbine.

In less preferred embodiments, of no control unit is used as part of the switching arrangement, the wind turbine controller may also receive the detection signal and may be configured to discard the error signal when the detection signal indicates no air traffic in the area around the wind turbine. This, however, is less preferred since it would require a modification of the wind turbine controller.

In a second alternative of embodiments of the invention, if the wind turbine controller provides a brightness signal to the marking light controller for controlling the brightness of the marking lights, the switching unit may be a control unit in the control line, which is configured to modify the brightness signal to turn off the at least one marking light when the detection signal indicates no air traffic in the area around the wind turbine. That is, in particular, the brightness is set to zero as long as no air traffic in the area around the wind turbine is indicated by the detection signal. If, in some embodiments, the marking light controller accepts external input regarding brightness of the at least one marking light, such input may thus be modified to switch off the at least one marking light without the need to modify any other component of the wind turbine. In this case, the switching unit is the control unit installed in the control line to, again like a man in the middle, modify at least the brightness signals according to the detection signal. In this second alternative, no relay is needed, such that a very low-cost and simple alternative is provided.

It is noted that, in both alternatives, but preferably in the second alternative, the control unit may be understood as being or comprising an additional I/O board providing additional inputs and/or outputs, at least one input relating to the detection signal. At least a part of other signals input into the control unit may be modified and/or discarded depending on the detection signal, as described.

If a brightness signal from the wind turbine controller to the marking light controller is used, the wind turbine may further comprise a visibility measuring device, wherein the wind turbine controller is configured to generate the brightness signal based on measurement data received from the visibility measurement device. For example, the visibility measuring device may measure weather effects which may increase or decrease visibility range to accordingly provide brighter or less brighter warning by the at least one marking light. However, it is noted that the brightness signal may also be additionally or alternatively derived from other information, for example from a current local time in correlation with the date and sun information.

The air traffic detection system may comprise at least one radar sensor and/or at least one transponder signal receiver. That is, the air traffic detection system may be radar-based and/or transponder-based, as already explained. Of course, also other air traffic detection systems may be used, for example, air traffic detection systems using information provided by an air space control center and the like.

As a retrofitting system for at least one wind turbine as initially described, the retrofitting system comprises:
an air traffic detection system, and
a switching arrangement comprising at least one switching unit for the power line or the control line, wherein the switching unit is configured to receive a detection signal from the air traffic detection system and to turn the at least one marking light on or off when the detection signal indicates air traffic or no air traffic, respectively, in an area around the wind turbine.

Of course, all remarks and features regarding the wind turbine analogously apply to the retrofitting system according to embodiments of the invention, with which wind turbines may be retrofitted without having to exchange their marking light system or to modify their wind turbine controller, to only use marking lights when air traffic is detected in the area around the wind turbine. It is noted that, while the switching arrangement is to be installed in the wind turbine, the air traffic detection system may also be partly or entirely installed externally to the wind turbine, or as a part of the wind turbine, as discussed above.

The retrofitting system can be used in a method for retrofitting at least one wind turbine, comprising
installation of the air traffic detection system, and
installation of the switching arrangement in the wind turbine. All remarks and features regarding the wind turbine and the retrofitting system analogously also apply to the method according to embodiments of the invention, in particular regarding the installation location of the air traffic detection system.

BRIEF DESCRIPTION

Figure 2:
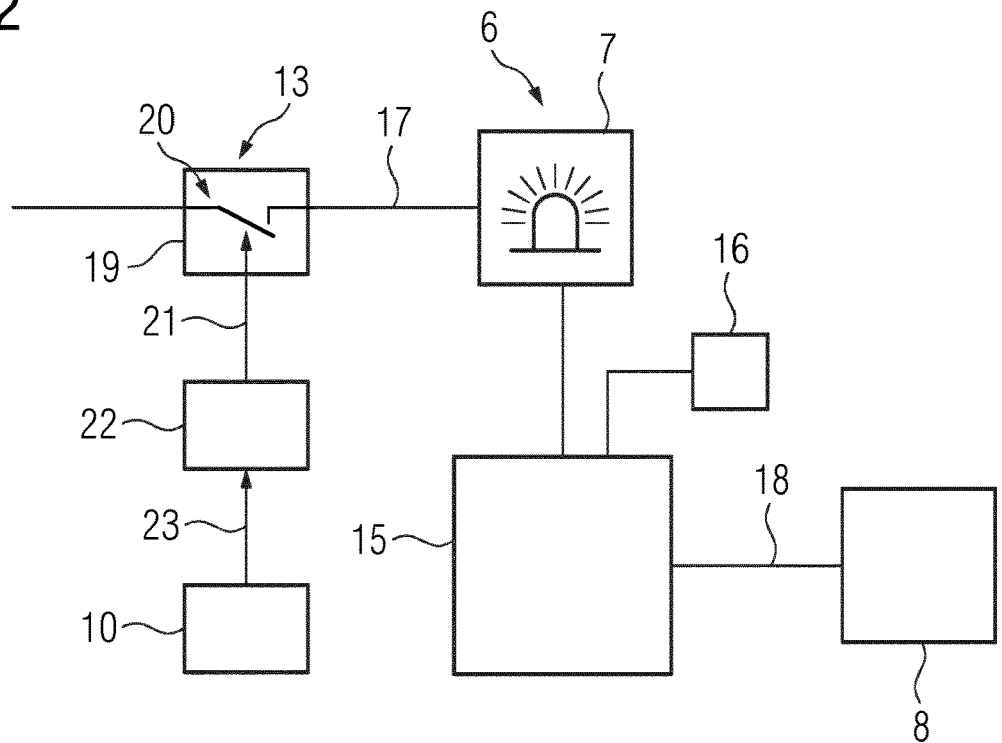
Figure 3:
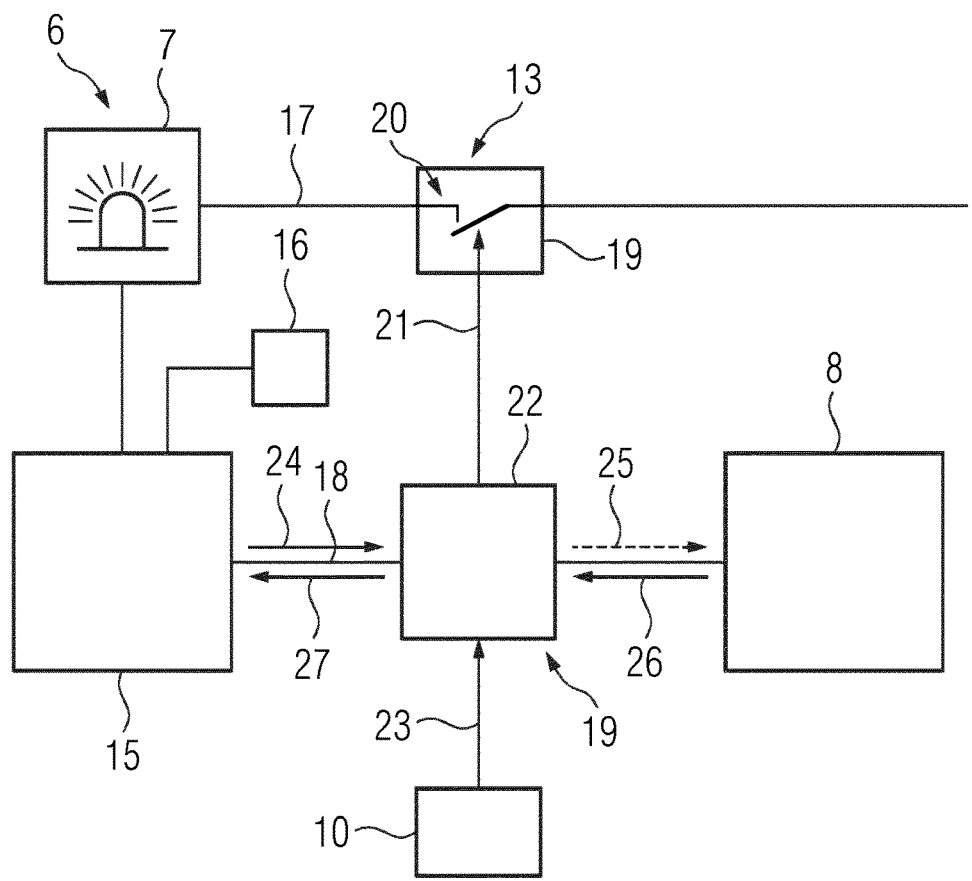
Figure 4:
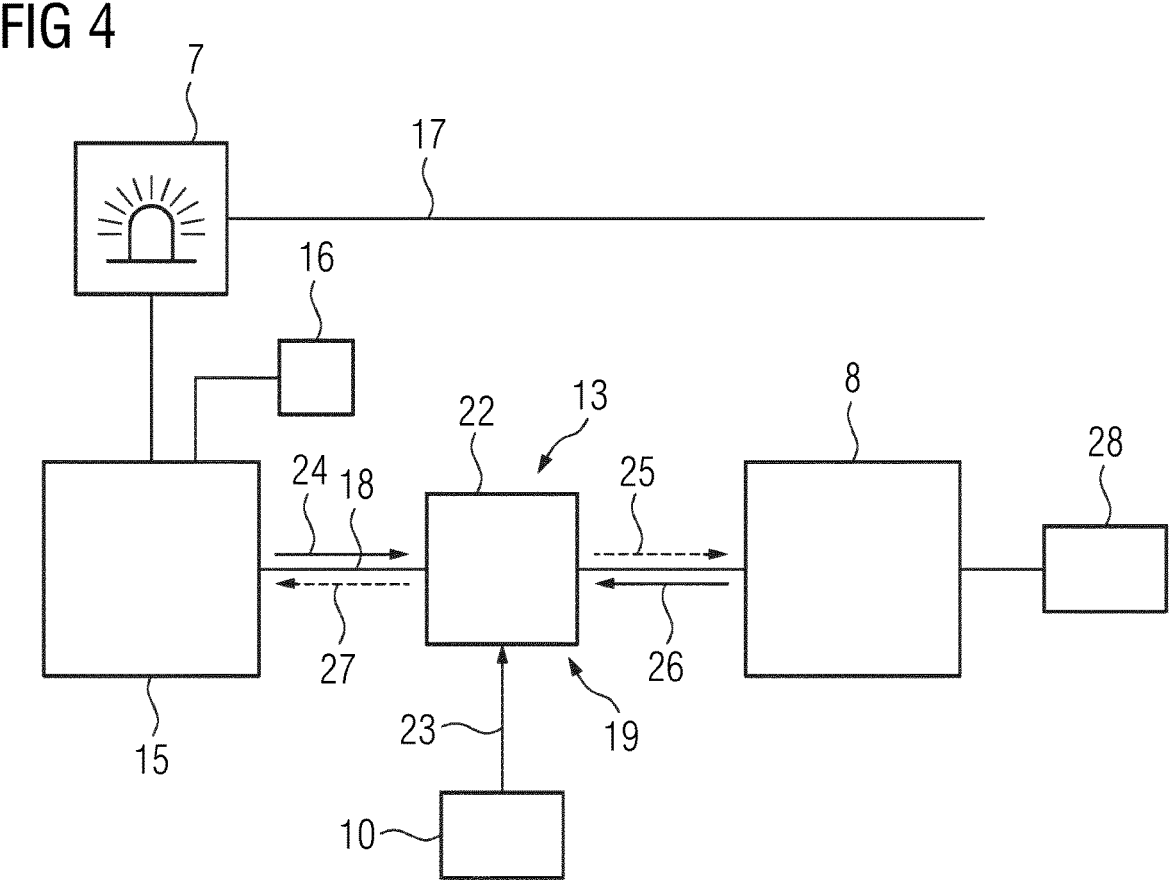

Some of the embodiments will be described in detail, with reference to the following figures, wherein like designations denote like members, wherein:

FIG. 1 a principle drawing of a wind turbine according to embodiments of the invention;

FIG. 2 a control configuration for a first embodiment of the invention;

FIG. 3 a control configuration for a second embodiment of the invention;

FIG. 4 a control configuration for a third embodiment of the invention; and

Figure 5:
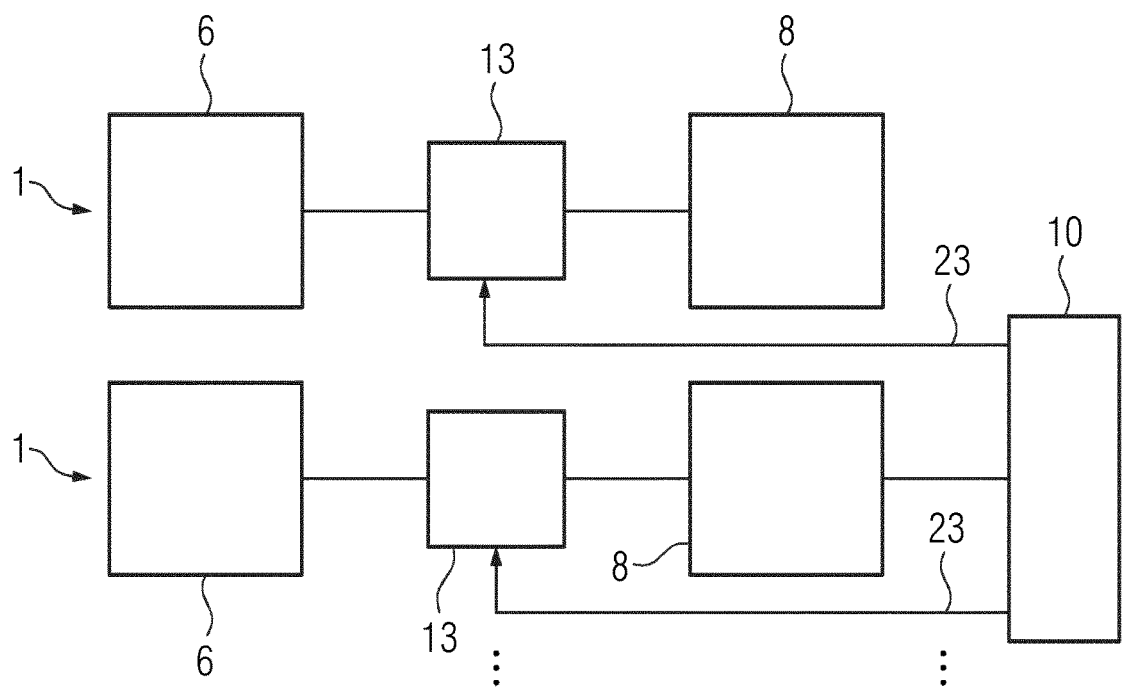

FIG. 5 a control configuration for multiple wind turbines having a common air traffic detection system.

DETAILED DESCRIPTION

FIG. 1 is a principle drawing of a wind turbine 1 according to embodiments of the invention. The wind turbine 1 comprises a tower 2 onto which a nacelle 3 is rotatably mounted. In the nacelle 3, for example, a generator of the wind turbine 1 (not shown) may be housed among other components. A hub 4 to which, in this case, three wind turbine blades 5 are mounted, is rotatably connected to the nacelle 3.

To warn incoming aircrafts of the presence of the wind turbine 1 as an obstacle, the wind turbine 1 comprises a marking light system 6 having at least one marking light 7, in this case installed, in this example, at the rear of the nacelle 3. The wind turbine 1 further comprises a wind turbine controller 8 communicating with the marking light system 6 via a control line, wherein the wind turbine controller 8 may, for example, be a main and/or master controller of the wind turbine 1. The marking light system 6 comprises light sensors as a data source, wherein the at least one marking light 7 may be turned on or off depending on sensor data of the at least one light sensor by a marking system controller, which is connected via the control line to the wind turbine controller 8. The wind turbine controller 8 may also be sending brightness signals governing the brightness of the at least one marking light 7 via the control line, for example depending on measurement data of a visibility measuring device, current time and/or date and sun information, and the like.

The wind turbine 1, however, has been retrofitted using a retrofitting system 9 according to embodiments of the invention to only activate the marking lights 7 when an aircraft is detected in an area around the wind turbine 1. The retrofitting system comprises an air traffic detection system 10 which may be radar-based, i.e., comprising at least one radar sensor 11, or transponder-based, i.e. comprising at least one transponder signal receiver 12. The air traffic detection system 10 may be at least partially installed in the wind turbine 1 but can also be at least partially provided externally to the wind turbine 1, in particular, if it is used for multiple wind turbines 1, in particular in a wind park.

The retrofitting system 9 further comprises a switching arrangement 13 which has been installed in the nacelle 3 of the wind turbine 1 without the need to modify the marking light system 6 or the wind turbine controller 8, as will be further discussed with regard to the concrete embodiments in FIGS. 2, 3 and 4.

In any case, via a communication link 14 which may be at least partly wireless, the switching arrangement 13 receives a detection signal from the air traffic detection system 10 indicating whether or not air traffic has been detected in the area around the wind turbine 1. The switching arrangement 13 keeps the at least one marking light 7 turned off as long as the detection signal indicates no air traffic detected in the area around the wind turbine.

FIG. 2 shows the control configuration used in a first, simple embodiment of the invention. As can be seen, the at least one marking light 7 is not only connected to the marking light controller 15 of the marking light system 6, to which also the at least one light sensor 16 is connected as a data source, but is also connected to an electrical power supply via a power line 17. The marking light controller 15 is connected to the wind turbine controller 8 via a control line 18.

As can be seen, the switching arrangement 13 comprises a switching unit 19, in this case a relay 20, installed in the power line 17 and adapted to interrupt or connect the power line 17 and thus the power supply to the at least one marking light 7. The switching unit 19 uses the detection signal, indicated by arrow 21, as a binary signal, which is of a low voltage if no aircraft has been detected in the area around the wind turbine 1. In this state, the relay 20 is open and the power supply to the at least one marking light 7 is interrupted. That is, even if the marking light controller 15 tries to turn on the at least one marking light 7, it will not shine, since no electrical power is available.

If, however, air traffic has been detected in the area around the wind turbine 1, the detection signal supplied to the relay 20 is of a high voltage such that the relay 20 closes and the at least one marking light 7 can be turned on and off by the marking light controller 15 as known.

The switching arrangement 13, as can be seen, further comprises a control unit 22 which may serve to convert the original detector signal received from the air traffic detection system 10 according to arrow 23, which may be received as a digital signal, to the binary, analog direct current variant according to arrow 21.

In some cases, the marking light controller 15 will send an error signal to the wind turbine controller 8 when a power disruption to the at least one marking light 7 is detected, in particular also if this is caused by the switching unit 19.

In this case, a configuration as shown in FIG. 3, which illustrates a second embodiment of the invention, may be used.

As a difference to the first embodiment of FIG. 2, the control unit 22 is now installed in the control line 18 and receives error signals according to arrow 24 from the marking light controller 15. If the error signal describes power interruption and the detection signal, which is again received according to arrow 23 from the air traffic detection system 10, converted and forwarded according to arrow 21 to the relay 20, indicates air traffic in the area around the wind turbine 1, the error signal is not forwarded to the wind turbine controller 8. The control unit 22 only forwards the error signal to the wind turbine controller 8 if the detection signal indicates air traffic in the area around the wind turbine 1, as indicated by dashed arrow 25. If the detection signal indicates no air traffic detected in the area around the wind turbine 1, the power disruption has been caused by the switching arrangement 13 itself and the error signal is thus suppressed/deleted. Other error signals are, of course, forwarded to the wind turbine controller 8 without modification, if they are not caused by switching activity of the switching unit 19. It is, however, noted, that while it is expedient to use the detection signal to describe switching activity as the cause of the error signal, other signal indicating the switching activity of the switching unit 19 may also be used.

It is noted that FIG. 3 also indicates, see arrow 26, 27, the possibility of control signals, in particular brightness signals, from the wind turbine controller 8 to the marking light controller 15, which are simply forwarded or not even touched by the control unit 22.

FIG. 4 shows a third embodiment in which the control unit 22 of the switching arrangement 13, which is again installed in the control line 18, is used as the switching unit 19 since the wind turbine controller 8 supplies brightness signals according to arrow 26 and 27 to the marking light controller 15, for example according to measurement data from a visibility measurement device 28. In this embodiment, the control unit 22 is configured to modify the brightness signals received according to arrow 26 to set the brightness to zero, that is, turn the at least one marking light 7 off, if the detection signal, again provided according to arrow 23, indicates no air traffic in the area around the wind turbine 1. Only if air traffic is indicated in the area around the wind turbine 1, the brightness signals are forwarded unmodified, as indicated by the dashed line of arrow 27.

It is noted that, in case that brightness signals indicating brightness zero would also result in an error signal by the marking light controller 15, the control unit 22 may also configured to suppress such signals if the detection signal 23 indicates no air traffic in the area around the wind turbine 1.

In the third embodiment of FIG. 4, as can be seen, the power line 17 is unmodified.

FIG. 5 illustrates how an air traffic detection system 10 can be associated with multiple wind turbines 1 by providing the detection signal according to arrows 23 to the switching arrangements 13 of each of those wind turbines 1.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
    a marking light system comprising at least one marking light for aerial traffic, a data source, which is at least one light sensor, and a marking light controller for controlling the at least one marking light according to data of the data source, which is sensor data of the at least one light sensor,
    a wind turbine controller,
    a power line for at least the at least one marking light and/or at least one control line connecting the marking light controller to the wind turbine controller, and
    wherein the wind turbine further comprises a switching arrangement comprising at least one switching unit in the power line or the control line, wherein the switching arrangement is independent of the marking light controller, wherein the switching unit is configured to receive a detection signal from an air traffic detection system associated with the wind turbine and to turn the at least one marking light on or off when the detection signal indicates air traffic or no air traffic, respectively, in an area around the wind turbine.

2. The wind turbine according to claim 1, wherein the switching unit is a relay in the power line, using the detection signal as a switching control signal.

3. The wind turbine according to claim 2, wherein, when the marking light controller is configured to generate an error signal to the wind turbine controller on power disruption to the at least one marking light, the switching arrangement additionally comprises a control unit receiving the error signal and the detection signal and configured to only forward the error signal when the error signal is not caused by switching activity of the switching unit, when the detection signal indicates air traffic in the area around the wind turbine.

4. The wind turbine according to claim 3, wherein, when the marking light controller is adapted to generate different error signals on different events, the control unit is configured to only block error signals relating to power disruption events depending on the detection signal.

5. The wind turbine according to claim 3, wherein the detection signal is received by the control unit and forwarded to the switching unit, modified and/or converted by the control unit.

6. The wind turbine according to claim 2, wherein the wind turbine controller also receives the detection signal and is configured to discard the error signal when the detection signal indicates no air traffic in the area around the wind turbine.

7. The wind turbine according to claim 1, wherein, when the wind turbine controller provides a brightness signal to the marking light controller for controlling the brightness of the marking lights, the switching unit is a control unit in the control line, which is configured to modify the brightness signal to turn off the at least one marking light when the detection signal indicates no air traffic in the area around the wind turbine.

8. The wind turbine according to claim 7, wherein it further comprises a visibility measuring device, wherein the wind turbine controller is configured to generate the brightness signal based on measurement data received from the visibility measurement device.

9. The wind turbine according to claim 1, wherein the air traffic detection system comprises at least one radar sensor and/or at least one transponder signal receiver.

10. A retrofitting system for at least one wind turbine, wherein the wind turbine comprises
    a marking light system comprising at least one marking light for aerial traffic, a data source, which is at least one light sensor, and a marking light controller for controlling the at least one marking light according to data of the data source, which is sensor data of the at least one light sensor,
    a wind turbine controller, and
    a power line for at least the at least one marking light and/or at least one control line connecting the marking light controller to the wind turbine controller, the retrofitting system comprising:
    an air traffic detection system, and
    a switching arrangement independent of the marking light controller and the wind turbine controller, the switching arrangement comprising at least one switching unit for the power line or the control line, wherein the switching unit is configured to receive a detection signal from the air traffic detection system and to turn the at least one marking light on or off when the detection signal indicates air traffic or no air traffic, respectively, in an area around the wind turbine.

11. A method for retrofitting at least one wind turbine, comprising:
    providing a wind turbine having a marking light system with at least one marking light for aerial traffic, a data source, which is at least one light sensor, and a marking light controller for controlling the at least one marking light according to data of the data source, which is sensor data of the at least one light sensor; a wind turbine controller; and a power line for at least the at least one marking light and/or at least one control line connecting the marking light controller to the wind turbine controller;
    providing an air traffic detection system; and
    installing a switching arrangement, wherein the switching arrangement is independent of the marking light controller and the wind turbine controller, wherein the switching arrangement has at least one switching unit for the power line or the control line, wherein the switching unit is configured to receive a detection signal from the air traffic detection system and to turn the at least one marking light on or off when the detection signal indicates air traffic or no air traffic, respectively, in an area around the wind turbine;
    wherein, when installing the switching arrangement, neither the marking light controller nor the wind turbine controller needs to be modified.

* * * * *